United States Patent Office 3,013,991
Patented Dec. 19, 1961

3,013,991
ORGANOPHOSPHORUS POLYMERS
William L. Fierce, Crystal Lake, and Walter J. Sandner, Carpentersville, Ill., assignors to The Pure Oil Company, Chicago, Ill., a corporation of Ohio
No Drawing. Filed Oct. 9, 1957, Ser. No. 689,055
14 Claims. (Cl. 260—2)

This invention relates to new and useful rubber-like polymers obtained as the reaction product of a phosphorus oxyhalide and straight-chain glycols having terminal hydroxyl groups, of molecular weight between 100 and 2000.

An object of this invention is to provide new rubbery organophosphorus polymers.

Another object is to provide a method for preparing new rubbery organophosphorus polymers.

A feature of this invention is the provision of a new rubbery organophosphorus polymer produced as the reaction product of a phosphorus oxyhalide and a straight-chain poly-glycol of molecular weight between about 100 and 2000, or a $C_3$–$C_{24}$ straight-chain alkanediol having terminal hydroxyl groups.

Another feature of this invention is the provision of a method for preparing rubbery organophosphorus polymers in which a phosphorus oxyhalide and a straight-chain poly-glycol of molecular weight between about 100 and 2000, or a $C_3$–$C_{24}$ straight-chain alkanediol with terminal hydroxyl groups is reacted to produce a rubbery solid reaction product.

Other objects and features of this invention will become apparent from time to time throughout the specification and claims as hereinafter related.

The preparation of phosphate esters is well known in the published literature. Phosphate esters are usually prepared by reaction of an alcohol with phosphorus oxychloride ($POCl_3$), usually in the presence of a basic catalyst such as pyridine. The reaction of phosphorus oxychloride with alkylene oxide polymers and with very high molecular weight polyethylene glycols is also known. Harman and Vaughan in U.S. Patent 2,536,685 report the reaction of alkylene oxide polymers with $PCl_3$ or $POCl_3$ at about 170° C. to produce liquids containing phosphorus and chlorine, which could be used as lubricants. Livengood in U.S. Patent 2,567,076 reports the reaction of $POCl_3$ with polyethylene glycols, having an average molecular weight of more than 4000, to produce waxy solids which are water-soluble. Experimental work has shown that ethylene glycol and 1,2-propylene glycol react with phosphorus oxychloride to produce water-soluble liquids. Poly-1,2-propylene glycols, having average molecular weights of about 425 and 1025, respectively, react with phosphorus oxychloride to give viscous, ether-soluble liquids.

Our invention is based upon the discovery that straight-chain aliphatic glycols with terminal hydroxyl groups, of molecular weight less than about 2000, react with phosphorus oxyhalides at $-10°$ to $+20°$ C. in non-aqueous inert solvents to produce rubbery solids as a reaction product. The reactant glycols which are included in the term "aliphatic straight-chain glycols" are the straight-chain $\alpha,\omega$-alkanediols [$HO(CH_2)_xOH$, where $x$ is 3 to 24] and condensed straight-chain polymers of straight-chain $\alpha,\omega$ alkanediols, having the general formula $HO((CH_2)_xO)_nH$, where $x$ is a small integer (e.g., 2–12) and $n$ is a small integer (2 or more) dependent upon size of $x$, of a size such that the molecular weight of the compound does not exceed about 2000. The polyethylene glycols [$HO(C_2H_4O)_nH$] are illustrative of the latter class of compounds. The rubbery solids produced in this process are very inert, and are insoluble in practically all common solvents. In the process of making these rubbery polymers any phosphorus oxyhalide, such as phosphorus oxybromide or phosphorus oxychloride, may be used, although the chloride is preferred. Polyethylene glycols are preferred in the production of these rubbery polymers and have the formula $HO(C_2H_4O)_nH$, where $n$ is an integer from about 2 to 45. Polyethylene glycols which may be used include diethylene glycol, triethylene glycol, tetraethylene glycol, pentaethylene glycol, and all other glycols of the general formula given, including mixtures thereof in all proportions. Alkanediols which may be used include $\alpha,\omega C_3$–$C_{24}$ straight-chain alkanediols, such as trimethylene glycol, tetramethylene glycol, pentamethylene glycol, hexamethylene glycol, decamethylene glycol, pentadecamethylene glycol, and 1,20-eicosanediol. The reaction is preferably carried out in an inert non-aqueous solvent (inert toward the reactants and reaction products) such as dimethyl ether, diethyl ether, carbon tetrachloride, trichloroethylene, toluene, hexane, or dimethyl phthalate. The reaction proceeds best in the presence of an amine (HCl acceptor) such as pyridine, quinoline or a dialkylaniline. The order of addition of reactants is not critical.

The following examples are illustrative of the process of preparing the new and useful rubbery polymers of this invention.

*Example I*

A 3-necked, round-bottomed flask was charged with 200 grams (0.5 mol) of polyethylene glycol 400, dissolved in 300 ml. of anhydrous ether. Polyethylene glycol 400 is a commercial product obtained from the Carbide and Carbon Chemicals Company, and is a mixture of polyethylene glycols having an average molecular weight of about 400 and containing polyethylene glycols ranging from tetraethylene glycol up to pentadecaethylene glycol, with octaethylene glycol, nonaethylene glycol, decaethylene glycol, hendecaethylene glycol, and dodecaethylene glycol predominating. To this solution 66.5 ml. (0.5 mol) of pyridine were added, and the mixture was cooled to 10° C. To this mixture was slowly added, with stirring, 26.7 g. (⅙ mol) of phosphorus oxychloride ($POCl_3$) dissolved in 100 ml. of anhydrous ether. The temperature was held near 10° C., and the addition time was about 1.5 hours. The reaction mixture was then allowed to warm to room temperature. A white, somewhat granular, solid product precipitated from the solution and was removed by filtration. The product was washed with dilute HCl and water, and finally dried. This product was rubbery and insoluble in all common solvents including water, dilute acid, acetone, ether, alcohol, and toluene. The rubbery nature of this product, together with its lack of solubility in any known solvent, made it practically impossible to determine the molecular structure. Because of the lack of solubility, and the rubbery character of the product, it was presumed to be of polymeric nature. The product was further characterized by a melting point (with decomposition) of about 265° C. The elemental analysis of this product was carbon 29%, hydrogen 8.9%, phosphorus 2.6%, nitrogen 0.05%, and chlorine 0.67%. This analysis does not correspond to any simple compound which could be produced by this reaction, and is believed to further substantiate the presumed polymeric nature of the product.

*Example II*

In another experiment a reaction was carried out in the identical manner described for Example I between phosphorus oxychloride ($POCl_3$) and triethylene glycol, $HO(C_2H_4O)_3H$, in anhydrous ether, using a pyridine catalyst, at about 10° C. As in Example I, the product precipitated as a rubbery solid which was insoluble in the common polar and non-polar solvents. This product had an elemental analysis of 37.5% carbon, 6.8% hydrogen, 9.0% phosphorus, 0.05% nitrogen, and 0.67% chlorine. The analysis does not correspond to any simple compound which could be produced by the two reactants. This product had a melting point (with decomposition) of about 224° C.

*Example III*

In still another experiment, phosphorus oxychloride and diethylene glycol ($HOC_2H_4OC_2H_4OH$) were reacted in the presence of pyridine, in solution in diethyl ether at 10° C. A white rubbery solid was recovered from the reaction mixture which was insoluble in any of the common solvents, and had a melting point (with decomposition) of about 275° C.

*Example IV*

When phosphorus oxybromide and polyethylene glycol 1000 (a mixture of polyethylene glycols of average molecular weight 1000) are reacted in solution in trichloroethylene at 0° C. in the presence of dimethylaniline (as an HCl acceptor) a rubbery solid is precipitated. This product is apparently a rubber-like polymer having properties similar to the products of Examples I, II and III.

*Example V*

Pentamethylene glycol (1,5-pentanediol) and $POCl_3$ in a 3:1 mol ratio were reacted at 10° C. in ether solution. The $POCl_3$ was added to an ether solution of pyridine and the glycol, following the same procedure as Examples I to III. As in the other examples, a rubbery solid was precipitated and recovered. This solid was insoluble in all common solvents and did not melt or decompose at 200° C. A similar product is produced when trimethylene glycol is reacted with $POCl_3$. The reaction of higher alkanediols, from 1,7-heptanediol to 1,20-eicosanediol, with $POCl_3$ proceeds similarly, but requires other solvents such as chloroethyl ether, trichloroethylene, etc., because of the insolubility of these glycols in diethyl ether.

The preparation of these organophosphorus rubbery polymers is apparently limited to the reaction of phosphorus oxyhalides and $\alpha,\omega$ aliphatic straight-chain glycols, as previously defined, of molecular weight less than about 2000. Ethylene glycol and branched-chain glycols, such as 1,2-propylene glycol, are inoperative for this purpose since they react with phosphorus oxyhalides to produce liquid products. Similarly, the very high molecular weight glycols, e.g., molecular weight of 4000 and above, are similarly inoperative since the product is a waxy, water-soluble material.

The rubber-like organophosphorus polymers produced in this invention have a variety of uses. These materials, because of their chemical inertness and lack of solubility in common solvents, may be used as fillers, packings, and absorbents for chemical reactors. These products in granulated form may be used as filter-aids for filter presses. The elasticity and high chemical and thermal stability of these polymers make it possible to substitute them for rubber and other elastic polymers for padding in upholstered furniture. These products may be finely granulated and incorporated in a paint base as a fire-retardant filler.

While we have fully and completely described our invention, as required by the patent laws, including specific operating embodiments of the best mode of carrying out our invention, we wish it understood that within the scope of the appended claims this invention may be practiced otherwise than as specifically described.

What is claimed is:

1. A process of preparing rubbery organophosphorus polymers which comprises, reacting a phosphorus oxyhalide with a glycol in a 1:3 mol ratio, said glycol being selected from the group consisting of polyethylene glycols of the formula $HO(C_2H_4O)_nH$, where $n$ is 2 to 45, and $\alpha,\omega$-$C_3$-$C_{24}$ straight-chain alkanediols in the presence of an amine selected from the group consisting of pyridine, quinoline, and dialkylanilines, at a temperature of about $-10°$ to $+20°$ C., in an inert, non-aqueous solvent, at a temperature of about $-10°$ C. to $+20°$ C. in an inert non-aqueous solvent, and recovering as a solid precipitate the reaction product consisting of a rubbery solid characterized by its insolubility in water, dilute acids, ketones, ether, alcohols, and hydrocarbons, and melting, with decomposition, at a temperature above 200° C.

2. A process according to claim 1 in which the phosphorus oxyhalide used is phosphorus oxybromide.

3. A process according to claim 1 in which phosphorus oxychloride and the polyethylene glycol are reacted in the presence of pyridine.

4. A process according to claim 3 in which phosphorus oxychloride is reacted with a mixture of polyethylene glycols having an average molecular weight of about 400.

5. A process according to claim 3 in which phosphorus oxychloride is reacted with triethylene glycol.

6. A process according to claim 3 in which phosphorus oxychloride is reacted with diethylene glycol.

7. A process according to claim 1 in which phosphorus oxychloride is reacted with 1,5-pentanediol.

8. A process according to claim 1 in which the solvent is selected from the group consisting of lower alkyl ethers, halogenated low-molecular-weight hydrocarbons, lower aliphatic hydrocarbons, lower aromatic hydrocarbons, and low-molecular-weight esters.

9. A process according to claim 1 in which the non-aqueous solvent is diethyl ether.

10. A rubbery polymer produced in accordance with claim 1 by reaction of phosphorus oxychloride with a mixture of polyethylene glycols having an average molecular weight of about 400, characterized by its insolubility in all common solvents, and melting with decomposition at a temperature of about 265° C.

11. A rubbery polymer produced in accordance with claim 1 by reaction of phosphorus oxychloride with triethylene glycol, characterized by its insolubility in all common solvents, and melting with decomposition at a temperature of about 224° C.

12. A rubbery polymer produced in accordance with claim 1 by reaction of phosphorus oxychloride with diethylene glycol, characterized by its insolubility in all common solvents, and melting with decomposition at a temperature of about 275° C.

13. A rubbery polymer produced in accordance with claim 1 by reaction of a phosphorus oxyhalide with $\alpha,\omega$-$C_3$-$C_{24}$ alkanediol, characterized by its insolubility in all common solvents and melting above 200° C.

14. A rubbery polymer produced in accordance with claim 1 by reaction of phosphorus oxychloride with 1,5-pentanediol.

References Cited in the file of this patent

UNITED STATES PATENTS 2,632,767    Smith et al. _____ Mar. 24, 1953

FOREIGN PATENTS 736,448    Great Britain _____ Sept. 7, 1955

UNITED STATES PATENT OFFICE
CERTIFICATION OF CORRECTION

Patent No. 3,013,991                      December 19, 1961

William L. Fierce et al.

It is hereby certified that error appears in the above numbered patent requiring correction and that the said Letters Patent should read as corrected below.

Column 4, lines 13 and 14, strike out "at a temperature of about $-10°$ C. to $+20°$ C. in an inert non-aqueous solvent," --.

Signed and sealed this 24th day of April 1962.

(SEAL)
Attest:

ESTON G. JOHNSON
Attesting Officer

DAVID L. LADD
Commissioner of Patents